(12) United States Patent
Peters et al.

(10) Patent No.: US 7,495,047 B2
(45) Date of Patent: *Feb. 24, 2009

(54) POLY(ARYLENE ETHER) COMPOSITION, METHOD, AND ARTICLE

(75) Inventors: Edward Norman Peters, Lenox, MA (US); Christina Louise Braidwood, Niskayuna, NY (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/244,989

(22) Filed: Oct. 6, 2005

(65) Prior Publication Data

US 2007/0082987 A1 Apr. 12, 2007

(51) Int. Cl.
*C08K 5/53* (2006.01)
(52) U.S. Cl. ..................................... 524/136
(58) Field of Classification Search .............. 524/136, 524/154
See application file for complete search history.

(56) References Cited

U.S. PATENT DOCUMENTS

| | | | |
|---|---|---|---|
| 3,018,290 A | 1/1962 | Sauers et al. | |
| 3,306,875 A | 2/1967 | Hay | |
| 3,334,064 A | 8/1967 | Bailey | |
| 3,375,228 A | 3/1968 | Holoch et al. | |
| 3,532,668 A * | 10/1970 | Savides | 524/112 |
| 3,547,877 A * | 12/1970 | Savides | 524/112 |
| 3,562,223 A | 2/1971 | Bargain et al. | |
| 4,148,843 A | 4/1979 | Goossens | |
| 4,172,858 A | 10/1979 | Clubley et al. | |
| 4,198,310 A * | 4/1980 | Lyons et al. | 174/110 SR |
| 4,211,860 A | 7/1980 | Stenzenberger | |
| 4,211,861 A | 7/1980 | Stenzenberger | |
| 4,389,516 A | 6/1983 | Sugio et al. | |
| 4,562,243 A | 12/1985 | Percec | |
| 4,663,402 A | 5/1987 | Percec et al. | |
| 4,665,137 A | 5/1987 | Percec | |
| H521 H | 9/1988 | Fan | |
| 4,866,114 A | 9/1989 | Taubitz et al. | |
| 4,923,932 A | 5/1990 | Katayose et al. | |
| 5,071,922 A | 12/1991 | Nelissen et al. | |
| 5,079,268 A | 1/1992 | Nelissen et al. | |
| 5,091,480 A | 2/1992 | Percec | |
| 5,215,860 A | 6/1993 | McCormick et al. | |
| 5,218,030 A | 6/1993 | Katayose et al. | |
| 5,304,600 A | 4/1994 | Nelissen et al. | |
| 5,310,820 A | 5/1994 | Nelissen et al. | |
| 5,338,796 A | 8/1994 | Vianello et al. | |
| 5,561,193 A | 10/1996 | Gottschalk et al. | |
| 5,955,184 A * | 9/1999 | Honda et al. | 428/299.4 |
| 6,124,385 A | 9/2000 | Honl et al. | |
| 6,211,402 B1 | 4/2001 | Kleiner | |
| 6,255,371 B1 | 7/2001 | Schlosser et al. | |
| 6,352,782 B2 | 3/2002 | Yeager et al. | |
| 6,355,832 B1 | 3/2002 | Weferling et al. | |
| 6,384,176 B1 | 5/2002 | Braat et al. | |
| 6,878,782 B2 | 11/2002 | Merfeld et al. | |
| 6,534,673 B1 | 3/2003 | Weferling et al. | |
| 6,547,992 B1 | 4/2003 | Schlosser et al. | |
| 6,576,700 B2 | 6/2003 | Patel | |
| 6,627,704 B2 | 9/2003 | Yeager et al. | |
| 6,716,899 B1 * | 4/2004 | Klatt et al. | 524/133 |
| 6,794,481 B2 | 9/2004 | Amagai et al. | |
| 6,812,276 B2 | 11/2004 | Yeager et al. | |
| 6,835,785 B2 | 12/2004 | Ishii et al. | |
| 6,906,120 B1 | 6/2005 | Davis et al. | |
| 6,964,746 B2 * | 11/2005 | Schlosser et al. | 252/609 |
| 2003/0148109 A1 * | 8/2003 | Timberlake et al. | 428/417 |
| 2004/0110878 A1 | 6/2004 | Knop et al. | |
| 2004/0225080 A1 | 11/2004 | Timberlake et al. | |
| 2004/0258852 A1 | 12/2004 | Ohno et al. | |
| 2004/0265595 A1 | 12/2004 | Tokiwa | |
| 2005/0014875 A1 | 1/2005 | Knop et al. | |
| 2005/0075426 A1 | 4/2005 | Campbell et al. | |
| 2005/0075427 A1 | 4/2005 | Campbell et al. | |
| 2005/0234161 A1 | 10/2005 | Steib et al. | |
| 2006/0074157 A1 * | 4/2006 | Bauer et al. | 524/115 |
| 2006/0111484 A1 * | 5/2006 | Fishburn | 524/115 |

FOREIGN PATENT DOCUMENTS

DE 10317487 A1 1/2004

(Continued)

OTHER PUBLICATIONS

International Search Report; International Application No. PCT/US2006/038500; International Filing Date Feb. 10, 2006; Date of Mailing of ISR Jul. 3, 2007 (6 pages).

(Continued)

*Primary Examiner*—D. Lawrence Tarazano
*Assistant Examiner*—John Uselding
(74) *Attorney, Agent, or Firm*—Cantor Colburn LLP

(57) ABSTRACT

A synergistic flame retardant combination includes (a) a phosphorus salt having the formula

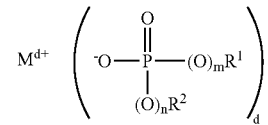

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (b) a phosphine compound selected from trihydrocarbylphosphines, trihydrocarbylphosphine oxides, and combinations thereof. Polymer compositions utilizing the flame retardant combination are described.

5 Claims, No Drawings

FOREIGN PATENT DOCUMENTS

| EP | 0075233 A1 | 3/1983 |
| EP | 0261574 B1 | 3/1988 |
| EP | 0 496 120 B1 | 7/1992 |
| EP | 0 501 162 B1 | 9/1992 |
| WO | WO 02/18493 A1 | 3/2002 |
| WO | WO 2005/044951 A1 | 5/2004 |

OTHER PUBLICATIONS

JP8245872; Sep. 24, 1996; Abstract Only (1 page).
JP5051511; Mar. 2, 1993; Abstract Only (1 page).
EP0496120; Jul. 29, 1992; Abstract Only (1 pg).
EP0501162; Sep. 2, 1992; Abstract Only (1 pg).
JP2004231781A; Aug. 19, 2004; Machine Translation Only (37 pgs).
JP2003128909A; May 8, 2003; Machine Translation Only (37 pgs).
JP2002129006A; May 5, 2002; Machine Translation Only (37 pgs).
JP2004263099A; Sep. 24, 2004; Machine Translation Only (35 pgs).
JP2002308948A; Oct. 23, 2002; Machine Translation Only (29 pgs).
WO0218493; Mar. 7, 2002; Abstract Only (1 pg).
WO2005044951; May 19, 2005; Abstract Only (1 pg).
J. De Boysere and Dr. Dietz, "New Halogen-Free Flame Retardants Based on Organic Phosphinate for Electronic Applications", Presented in the ECWC 10 Conference at IPC Printed Circuits Expo, SMEMA Council APEX and Designers Summit 05 (5 pgs).
ASTM D1531-01 Standard Test Methods for Relative Permittivity (Dielectric Constant) and Dissipation Factor by Fluid Displacement Procedures (10 pgs).
Clariant Brochure on Exolit http://europa.eu.int/comm/environment/waste/stakeholders/individual_bus/clariant/att_1.pdf (2 pgs).
Baker-Jarvis, J. et al., NIST Technical Note 1520, "Dielectric and Conductor-Loss Characterization and Measurements on Electronic Packaging Materials", (Sects 3.2.1-3.2.4.) 2001 (9 pgs).
EP1452563; Sep. 1, 2004; Abstract Only (1 page).

* cited by examiner

POLY(ARYLENE ETHER) COMPOSITION, METHOD, AND ARTICLE

BACKGROUND OF THE INVENTION

In the plastics industry, many product applications require flame retardant plastic compositions. In some cases, this can be achieved by using inherently flame-retardant plastics, such as halogenated polymers. In other cases, plastics that are not inherently flame-retardant are required, and flame retardant additives must be added to the plastics composition. However, many of the most effective flame retardant additives are halogenated compounds that are currently disfavored for health or environmental reasons. Furthermore, when non-halogenated flame retardant additives are used, they often must be employed in high concentrations to achieve the desired flame retardancy, and these high concentrations detract from the desired physical properties of the plastic composition. There is therefore a need for flame-retardant compositions that are both halogen-free and effective at low concentrations.

BRIEF DESCRIPTION OF THE INVENTION

The above-described and other drawbacks are alleviated by a flame retardant composition, comprising: a phosphorus salt having the formula

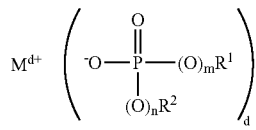

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and a phosphine compound selected from trihydrocarbylphosphines, trihydrocarbylphosphine oxides, and combinations thereof.

Another embodiment is flame-retardant plastic composition, comprising: (a) a thermoplastic resin or a thermoset resin; and (b) a flame retardant comprising (b1) a phosphorus salt having the formula

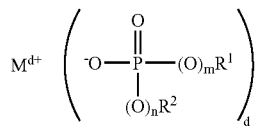

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (b2) a phosphine compound selected from trihydrocarbylphosphines, trihydrocarbylphosphine oxides, and combinations thereof.

Another embodiment is a curable composition, comprising: (a) a functionalized poly(arylene ether) resin; (b) a curable compound selected from triallyl cyanurate, triallyl isocyanurate, epoxy resins, bismaleimide resins, bismaleimide triazine resins, and combinations thereof; and (c) a flame retardant, comprising (c1) a phosphorus salt having the formula

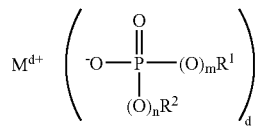

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (c2) a phosphine compound selected from trihydrocarbylphosphines, trihydrocarbylphosphine oxides, and combinations thereof.

Other embodiments, including methods of preparing the compositions, articles prepared from the flame-retardant plastic composition, and cured compositions and articles prepared from the curable composition, are described in detail below.

DETAILED DESCRIPTION OF THE INVENTION

A first category of embodiments relates to the flame retardant composition itself. Thus, one embodiment is a flame retardant composition, comprising: a phosphorus salt having the formula

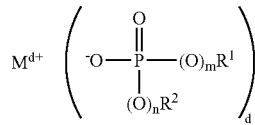

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and a phosphine compound selected from trihydrocarbylphosphines, trihydrocarbylphosphine oxides, and combinations thereof. The present inventors have discovered that the combination of the phosphorus salt and the phosphine compound has a synergistic flame retardant effect that provides improved flame retardancy compared to the individual components. This advantage can be used to reduce the total amount of flame retardant required, thereby improving physical properties of a plastic composition. Alternatively, the advantage can be used to achieve greater flame retardancy (e.g., a UL 94 rating of V-0) than was previously attainable at any tolerable level of flame retardant compound. The flame retardant combination is suitable for use with a wide variety of plastic compositions, including those comprising thermoplastic resins and those comprising thermoset resins. One specific use of the flame retardant composition is as an additive to a curable composition comprising a functionalized poly(arylene ether), and a curable compound such as triallyl cyanurate, triallyl isocyanurate, an epoxy resin, a bismaleimide resin, a bismaleimide triazine resin, or the like.

The phosphorus salt used in the flame retardant composition has the formula

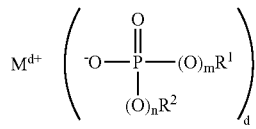

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl or hydrocarbylene residue may also contain carbonyl groups, amino groups, hydroxyl groups, or the like, or it may contain heteroatoms within the backbone of the hydrocarbyl residue.

In one embodiment, $M^{d+}$ is an onium ion. Suitable onium ions include, for example, ammonium cation ($NH_4^+$), mono-($C_1$-$C_{12}$)-hydrocarbylammonium cations, di-($C_1$-$C_{12}$)-hydrocarbylammonium cations, tri-($C_1$-$C_{12}$)-hydrocarbylammonium cations, tetra-($C_1$-$C_{12}$)-hydrocarbylammonium cations, phosphonium cation ($PH_4^+$), mono-($C_1$-$C_{12}$)-hydrocarbylphosphonium cations, di-($C_1$-$C_{12}$)-hydrocarbylphosphonium cations, tri-($C_1$-$C_{12}$)-hydrocarbylphosphonium cations, tetra-($C_1$-$C_{12}$)-hydrocarbylphosphonium cations, sulfonium cation ($SH_3^+$), mono-($C_1$-$C_{12}$)-hydrocarbylsulfonium cations, di-($C_1$-$C_{12}$)-hydrocarbyl sulfonium cations, tri-($C_1$-$C_{12}$)-hydrocarbyl sulfonium cations, and the like, and combinations thereof.

In another embodiment, $M^{d+}$ is a metal ion. Suitable metal ions include, for example, ions of magnesium, calcium, aluminum, antimony, tin, germanium, titanium, zinc, iron, zirconium, cerium, bismuth, strontium, manganese, lithium, sodium, potassium, and the like, and combinations thereof. In one embodiment, $M^{d+}$ is $Al^{3+}$.

Referring again to the phosphorus salt structure above, in one embodiment each occurrence of $R^1$ and $R^2$ is independently $C_1$-$C_6$ alkyl. In another embodiment, each occurrence of $R^1$ and $R^2$ is methyl or ethyl. In a preferred embodiment, M is aluminum and each occurrence of m and n is zero. In another preferred embodiment, the phosphorus salt comprises aluminum tris(diethylphosphinate).

The flame retardant composition may comprise about 5 to about 95 parts by weight of the phosphorus salt, based on 100 parts by weight total of the phosphorus salt and the phosphine compound. Within this range, the phosphorus salt amount may be at least about 10 parts by weight, or at least about 20 parts by weight. Also within this range, the phosphorus salt amount may be up to about 90 weight percent, or up to about 80 weight percent.

In addition to the phosphorus salt, the flame retardant composition comprises a phosphine compound selected from trihydrocarbylphosphines, trihydrocarbylphosphine oxides, and combinations thereof. The phosphine compound may be a trihydrocarbylphosphine. The trihydrocarbylphosphine may have the structure

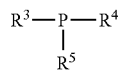

wherein $R^3$-$R^5$ are each independently $C_1$-$C_{12}$ hydrocarbyl, with the proviso that the trihydrocarbylphosphine has at least six carbon atoms. In the context of the trihydrocarbylphosphine and the trihydrocarbylphosphine oxide discussed below, the hydrocarbyl substituent may include, in addition to carbon and hydrogen, a hydroxy substituent (e.g., the hydrocarbyl substituent may be 4-hydroxyphenyl), or an ether oxygen (e.g., the hydrocarbyl substituent may be 4-phenoxyphenyl). Suitable trihydrocarbylphosphines include, for example, triphenylphosphine, allyldiphenylphosphine, diallylphenylphosphine, triallylphosphine, bis(1-naphthyl)(4-hydroxyphenyl)phosphine, bis(4-hydroxyphenyl)(1-naphthyl)phosphine, tris(4-hydroxyphenyl)phosphine, tris(1-naphthyl)phosphine, tris(2-naphthyl)phosphine, bis(4-phenoxyphenyl)(4-hydroxyphenyl)phosphine, bis(4-hydroxyphenyl)(4-phenoxyphenyl)phosphine, tris(4-phenoxyphenyl)phosphine, bis(2,4,5-trimethylphenyl)(4-hydroxyphenyl)phosphine, bis(4-hydroxyphenyl)(2,4,5-trimethylphenyl)phosphine, tris(2,4,5-trimethylphenyl)phosphine, bis(tert-butyl)(4-hydroxyphenyl)phosphine, bis(4-hydroxy-phenyl)(tert-butyl)phosphine, tris(tert-butyl)phosphine, and the like, and combinations thereof.

The phosphine compound may be a trihydrocarbylphosphine oxide. The trihydrocarbylphosphine oxide may have the structure

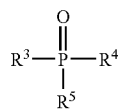

wherein $R^3$-$R^5$ are each independently $C_1$-$C_{12}$ hydrocarbyl, with the proviso that the trihydrocarbylphosphine oxide has at least six carbon atoms. Suitable trihydrocarbylphosphine oxides include, for example, triphenylphosphine oxide, allyldiphenylphosphine oxide, diallylphenylphosphine oxide, triallylphosphine oxide, bis(1-naphthyl)(4-hydroxyphenyl) phosphine oxide, bis(4-hydroxyphenyl)(1-naphthyl) phosphine oxide, tris(4-hydroxyphenyl)phosphine oxide, tris(1-naphthyl)phosphine oxide, tris(2-naphthyl)phosphine oxide, bis(4-phenoxyphenyl)(4-hydroxyphenyl)phosphine oxide, bis(4-hydroxyphenyl)(4-phenoxyphenyl)phosphine oxide, tris(4-phenoxyphenyl)phosphine oxide, bis(2,4,5-trimethylphenyl)(4-hydroxyphenyl)phosphine oxide, bis(4-hydroxyphenyl)(2,4,5-trimethylphenyl)phosphine oxide, tris(2,4,5-trimethylphenyl)phosphine oxide, bis(tert-butyl)(4-hydroxyphenyl)phosphine oxide, bis(4-hydroxy-phenyl) (tert-butyl)phosphine oxide, tris(tert-butyl)phosphine oxide, and the like, and combinations thereof.

The flame retardant composition may comprise about 5 to about 95 parts by weight of the phosphine compound, based on 100 parts by weight total of the phosphorus salt and the phosphine compound. Within this range, the phosphine compound amount may be at least about 10 parts by weight, or at least about 20 parts by weight. Also within this range, the phosphine compound amount may be up to about 90 weight percent, or up to about 80 weight percent.

One embodiment is a flame retardant composition comprising a phosphorus salt having the formula

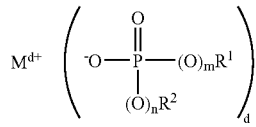

wherein $M^{d+}$ is $Al^{3+}$, each occurrence of $R^1$ and $R^2$ is independently $C_1$-$C_6$ hydrocarbyl, and each occurrence of m and n is 0; and a trihydrocarbylphosphine oxide having the structure

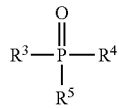

wherein $R^3$-$R^5$ are each independently $C_3$-$C_{12}$ hydrocarbyl.

One embodiment is a flame retardant composition comprising aluminum tris(diethylphosphinate) and a phosphine oxide selected from triphenylphosphine oxide, allyldiphenylphosphine oxide, and combinations thereof.

In one embodiment, the flame retardant composition may be prepared by blending the phosphorus salt and the phosphine compound. However, it is not necessary for these two components to be pre-blended before addition to a polymer composition. For example, as demonstrated in the working examples below, the advantages of the flame retardant combination may be attained if the phosphorus salt and the phosphine compound are added as separate components to a polymer composition that is subsequently intimately blended.

The flame retardant composition is useful to impart flame retardancy to a variety of polymeric compositions. Thus, a second category of embodiments relates to a composition, comprising: (a) a thermoplastic resin or a thermoset resin; and (b) a flame retardant comprising (b1) a phosphorus salt having the formula

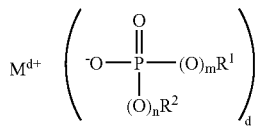

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1, and (b2) a phosphine compound selected from trihydrocarbylphosphines, trihydrocarbylphosphine oxides, and combinations thereof. Combinations (blends) of thermoplastic resin and thermoset resin may be used. Thermoplastic resins suitable for use in the composition include, for example, poly(arylene ether)s, poly(arylene sulfide)s, polyamides, polystyrenes including homopolystyrene and rubber-modified polystyrene ("high impact polystyrene" or "HIPS"), polyolefins including polyethylene and polypropylene, polyesters including polyarylates, polycarbonates, poly(styrene-co-acrylonitrile)s ("SAN"), poly(acrylonitrile-co-butadiene-co-styrene)s ("ABS"), poly(styrene-co-maleic anhydride)s ("SMA"), poly(acrylonitrile-co-styrene-co-acrylate)s ("ASA"), polyimides, polyamideimides, polyetherimides, polysulfones, polyethersulfones, polyketones, polyetherketones, polysiloxanes, and the like, and combinations thereof. These thermoplastic resins and methods for their preparation are known in the art. Combinations (blends) of the aforementioned thermoplastic resins include, for example, poly(arylene ether)-polyamide blends, poly(arylene ether)-polystyrene blends, poly(arylene ether)-polyolefin blends, polycarbonate-polyester blends, polycarbonate-ABS blends, polycarbonate-polysiloxane blends, and polyetherimide-polysiloxane blends. In one embodiment, the thermoplastic resin comprises a poly(arylene ether). Preferred poly(arylene ether)s include homopolymers of 2,6-dimethylphenol (i.e., poly(2,6-dimethyl-1,4-phenylene ether) and copolymers of 2,6-dimethylphenol and 2,3,6-trimethylphenol (i.e., poly(2, 6-dimethyl-1,4-phenylene ether-co-2,3,6-trimethyl-1,4-phenylene ether)).

Thermoset resins suitable for use in the composition include, for example, epoxy resins, unsaturated polyester resins, polyimide resins, bismaleimide resins, bismaleimide triazine resins, cyanate ester resins, vinyl resins, benzoxazine resins, benzocyclobutene resins, acrylics, alkyds, phenol-formaldehyde resins, novolacs, resoles, melamine-formaldehyde resins, urea-formaldehyde resins, hydroxymethylfurans, isocyanates, diallyl phthalate, triallyl cyanurate, triallyl isocyanurate, unsaturated polyesterimides, and the like, and combinations thereof. In one embodiment, the thermoset resin comprises an epoxy resin. In another embodiment, the thermoset resin comprises triallyl cyanurate. In another embodiment, the thermoset resin comprises triallyl isocyanurate.

Particularly suitable epoxy resins include those described by the structure

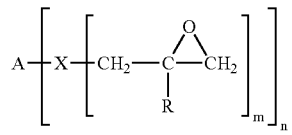

wherein A is an organic or inorganic radical of valence n, X is oxygen or nitrogen, m is 1 or 2 and consistent with the valence of X, and n is from 1-1000 ideally 2-8, most preferably 2-4.

Suitable epoxy resins include those produced by the reaction of epichlorohydrin or epibromohydrin with a phenolic compound. Suitable phenolic compounds include, for example, resorcinol, catechol, hydroquinone, 2,6-dihydroxy naphthalene, 2,7-dihydroxynapthalene, 2-(diphenylphosphoryl)hydroquinone, bis(2,6-dimethylphenol)2,2'-biphenol, 4,4-biphenol, 2,2',6,6'-tetramethylbiphenol, 2,2',3,3',6, 6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoprqylidene)bisphenol (bisphenol P), 4,4'- ethylidenediphenol (bisphenol E), 4,4'oxydiphenol, 4,4'thiodiphenol, 4,4'thiobis(2,6-dimethylphenol), 4,4'-sufonyldiphenol, 4,4'-sufonylbis(2,6-dimethylphenol) 4,4'sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol), dicyclopentadienyl bisphenol, and the like, and mixtures thereof.

Other suitable epoxy resins include N-glycidyl phthalimide, N-glycidyl tetrahydrophthalimide, phenyl glycidyl ether, p-butylphenyl glycidyl ether, styrene oxide, neohexene oxide, ethylene glycol diglycidyl ether, polyethylene glycol diglycidyl ether, propylene glycol diglycidyl ether, polypropylene glycol diglycidyl ether, tetramethyleneglycol diglycidyl ether, polytetramethylene glycol diglycidyl ether, bisphenol A-type epoxy compounds, bisphenol S-type epoxy compounds, resorcinol-type epoxy compounds, phenol novolac-type epoxy compounds, cresol novolac-type epoxy compounds, adipic acid diglycidyl ester, sebacic acid diglycidyl ester, phthalic acid diglycidyl ester, and the like, and mixtures thereof.

Also suitable as epoxy resins are the glycidyl ethers of phenolic resins such as the glycidyl ethers of phenol-formaldehyde novolac, alkyl substituted phenol-formaldehyde resins including cresol-formaldehyde novolac, t-butylphenol-formaldehyde novolac, sec-butylphenol-formaldehyde novolac, tert-octylphenol-formaldehyde novolac, cumylphenol-formaldehyde novolac, decylphenol-formaldehdye novolacs, and the like. Other useful epoxies are the glycidyl ethers of bromophenol-formaldehdye novolac, chlorophenol-formaldehyde novolac, phenol-bis(hydroxymethyl)benzene novolac, phenol-bis(hydroxymethylbiphenyl) novolac, phenol-hydroxybenzaldehyde novolac, phenol-dicyclopentadiene novolac, naphthol-formaldehyde novolac, naphthol-bis(hydroxymethyl)benzene novolac, naphthol-bis(hydroxymethylbiphenyl) novolac, naphthol-hydroxybenzaldehyde novolac, naphthol-dicyclopentadiene novolacs, and the like, and mixtures thereof.

Also suitable as epoxy resins are the polyglycidyl ethers of polyhydric aliphatic alcohols. Examples of such polyhydric alcohols that may be mentioned are 1,4-butanediol, 1,6-hexanediol, polyalkylene glycols, glycerol, trimethylolpropane, 2,2-bis(4-hydroxy-cyclohexyl)propane and pentaerythritol.

Curing agents for the epoxy resins include amine compounds, anhydrides, benzenediol compounds, bisphenol resin, polyhydric phenol resin, phenolic resins, and the like. Examples of the amine compounds include aliphatic amine compounds, such as diethylene triamine (DETA), triethylene tetramine (TETA), tetraethylene pentamine (TEPA), diethylaminopropylamine (DEAPA), methylene diamine, N-aminoethylpyrazine (AEP), m-xylylene diamine (MXDA) and the like; aromatic amine compounds such as m-phenylene diamine (MPDA), 4,4'-diaminodiphenylmethane (MDA), diaminodiphenylsulfone (DADPS), diaminodiphenyl ether and the like; and secondary or tertiary amine compounds such as phenylmethyldimethylamine (BDMA), dimethylaminomethylphenol (DMP-10), tris(dimethylaminomethyl)phenol (DMP-30), piperidine, 4,4'-diaminodicyclohexylmethane, 1,4-diaminocyclohexane, 2,6-diaminopyridine, m-phenylenediamine, p-phenylenediamine, 4,4'-diaminodiphenylmethane, 2,2'-bis(4-aminophenyl)propane, benzidine, 4,4'-diaminophenyl oxide, 4,4'-diaminodiphenylsulfone, bis(4-aminophenyl)phenylphosphine oxide, bis(4-aminophenyl)methylamine, 1,5-diaminonaphthalene, m-xylenediamine, p-xylenediamine, hexamethylenediamime, 6,6'-diamine-2,2'-pyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazo(4,5-d)thiazole, 5,5'-di(m-aminophenyl)-(2,2')-bis-(1,3,4-oxadiazolyl), 4,4'-diaminodiphenylether, 4,4'-bis(p-aminophenyl)-2,2'-dithiazole, m-bis(4-p-aminophenyl-2-thiazolyl)benzene, 4,4'-diaminobenzanilide, 4,4'-diaminophenyl benzoate, N,N'-bis(4-aminobenzyl)-p-phenylenediamine, and 4,4'-methylenebis(2-chloroaniline); melamine, 2-amino-s-triazine, 2-amino-4-phenyl-s-triazine, 2-amino-4-phenyl-s-triazine, 2-amino-4,6-diethyl-s-triazine, 2-amino-4,6-diphenyl-s-triazine, 2-amino-4,6-bis(p-methoxyphenyl)-s-triazine, 2-amino-4-anilino-s-triazine, 2-amino-4-phenoxy-s-triazine, 2-amino-4-chloro-s-triazine, 2-amino -4-aminomethyl-6-chloro-s-triazine, 2-(p-aminophenyl)-4,6-dichloro-s-triazine, 2,4-diamino-s-triazine, 2,4-diamino-6-methyl-s-triazine, 2,4-diamino-6-phenyl-s-triazine, 2,4-diamino-6-benzyl-s-triazine, 2,4-diamino-6-(p-aminophenyl)-s-triazine, 2,4-diamino-6-(m-aminophenyl)-s-triazine, 4-amino-6-phenyl-s-triazine-2-ol, and 6-amino-s-triazine-2,4-diol, and the like, and mixtures thereof.

Suitable cyanate ester resins include compounds of structure

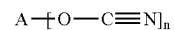

wherein A is an organic or inorganic radical of valence n; and n is from 1-1000 ideally 2-8, most preferably 2-4. Suitable cyanate esters useful include cyanatobenzene, 1,3-4-cumylcyanatobenzene, dicyanatobenzene, 2-t-butylcyanatobenzene, 2,5-di-t-butyl -1,4-dicyanatobenzene, 2,5-di-t-butyl-1,3-dicyanatobenzene, 4-chloro-1,3-dicyanatobenzene, 1,3,5-tricyanatobenzene, 4,4'-cyanatobiphenyl 2,2'-dicyanatobiphenyl, 2,4-dimethyl-1,3-dicyanatobenzene, tetramethyldicyanatobenzene, 1,3-dicyanatonaphthalene, 1,4-dicyanatonaphthalene, 1,5-dicyanatonaphthalene, 1,6-dicyanatonaphthalene, 1,8-dicyanatonaphthalene, 2,6-dicyanatonaphthalene, 2,7-dicyanatonaphthalene, 2,2-bis(3,5-dibromo-4-cyanatophenyl)propane 1,3,6-tricyanatonapthalene, 2,2-bis(4-cyanatophenyl)propane, bis(4-cyanatophenyl)methane, bis(3-chloro-4-cyanatophenyl) methane bis(3,5-dimethyl -4-cyanatophenyl)methane, 1,3-bis[4-cyanatophenyl-1-(1-methylethylidene)]benzene, 1,1,1-tris(4-cyanatophenyl)ethane, 1,4-bis[4-cyanatophenyl-1-(1-methylethylidene)]-benzene, and the like, and mixtures thereof. The cyanate ester may be a cyanate ester prepolymer, such as, for example, prepolymers of 2,2-bis(4-cyanatophenyl)-propane, bis(3,5-dimethyl-4-cyanatophenyl)methane, 1,3-bis[4-cyanatophenyl-1-(1-methylethylidene)]benzene, 1,4-bis[4-cyanatophenyl-1-(1-methylethylidene)]benzene, bis(4-cyanatophenyl)ether, bis(p-cyanophenoxyphenoxy)benzene, di(4-cyanatophenyl)ketone, bis(4-cyanatophenyl)thioether, bis(4-cyanatophenyl)sulfone, tris(4-cyanatophenyl)phosphite, and tris(4-cyanatophenyl)phosphate. Also useful are other cyanates as disclosed in U.S. Pat. No. 5,215,860, col. 10, lines 19 to 38.

Cyanate ester prepolymers that can be used in the present invention contain free cyanate ester groups and may be produced by partial curing of the cyanate ester resin in the presence or absence of a catalyst. A typical example of such a cyanate ester prepolymer is the partial reaction product of bis(3,5-dimethyl-4-cyanatophenyl)methane, sold under the tradename AroCy® B-30, B-50 M-20, PT-60, PT-60S, and CT-90 by Lonza. Ltd., Switzerland. Mixtures of two or more different cyanate ester prepolymers may be used, as can mixtures of one or more cyanate ester prepolymers with one or more cyanate ester-containing compounds that are not prepolymers. Useful cyanate esters include materials commercially produced by Lonza Ltd., Switzerland and include, for example, B-10, B-30, M-10, M-30, PT-15, PT-30, PT-30S, PT-60, PT-60S, CT-90, BA-230S, L-10, F -10, RTX-399, RTX-366, and Quatrex-7187 resins Metal salt catalysts, such as metal carboxylates can be used to accelerate the cure rate of cyanate esters. Catalysts include manganese naphthenate, zinc naphthenate, cobalt naphthenate, nickel naphthenate, cerium naphthenate, manganese octanoate, zinc octanoate, cobalt octanoate, nickel octanoate and cerium octanoate, and the like.

Suitable bismaleimides include those of structure

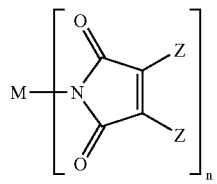

wherein in M is a radical containing 2-40 carbon atoms of valence n and each Z is independently a hydrogen, halogen or an aromatic or aliphatic radical and n equals 0-10. M can be aliphatic, cycloaliphatic, aromatic or heterocyclic. A preferred class of bisimides is difunctional bismaleimides derived from aliphatic or aromatic diamines.

Specific examples of unsaturated imides include 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimidopyridine, 1,3-bis(maleimidomethyl)cyclohexane, 1,3-bis (maleimidomethyl)benzene, 1,1-bis(4-maleimidophenyl)cyclohexane, 1,3-bis(dichloromaleimido)benzene, 4,4'-biscitraconimidodiphenylmethane, 2,2-bis(4-maleimidophenyl)propane, 1-phenyl -1,1-bis(4-maleimidophenyl)ethane, αα-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-alpha,alpha'-4,4'-dimethylenecyclohexanebismaleimide, N,N'-m-xylenebismaleimide, N,N'-4,4'-diphenylcyclohexanebismaleimide, and N,N'-methylenebis(3-chloro-p -phenylene)bismaleimide, various maleimides disclosed in U.S. Pat. Nos. 3,562,223, 4,211,860 and 4,211,861, and the like, and mixtures thereof. Maleimides can be prepared by methods known in the art, including, for example, those described in U.S. Pat. No. 3,018,290. In one embodiment, the maleimide resin is N,N'-4,4'-diphenylmethane bismaleimide.

The composition may comprise about 50 to about 99 parts by weight of the thermoplastic resin and/or thermoset resin per 100 parts by weight total of the thermoplastic resin and/or thermoset resin and the flame retardant. Within this range, the amount of thermoplastic resin and/or thermoset resin may be at least about 60 parts by weight, or at least about 70 parts by weight. Also within this range, the amount of thermoplastic resin and/or thermoset resin may be up to about 95 parts by weight, or up to about 90 parts by weight.

The composition may comprise about 1 to about 50 parts by weight of the flame retardant, based on 100 parts by weight total of the thermoplastic resin or thermoset resin and the flame retardant. Within this range, the flame retardant amount may be at least about 5 parts by weight, or at least about 10 parts by weight. Also within this range, the flame retardant amount may be up to about 40 parts by weight, or up to about 30 parts by weight.

One embodiment is a composition, comprising: (a) a thermoplastic resin selected from poly(arylene ether)s, poly (arylene sulfide)s, polyamides, polystyrenes, polyolefins, polyesters, polycarbonates, poly(styrene-co-acrylonitrile)s, poly(acrylonitrile-co-butadiene-co-styrene)s, poly(styrene-co-maleic anhydride)s, poly(acrylonitrile-co-styrene-co-acrylate)s, polyimides, polyamideimides, polyetherimides, polysulfones, polyethersulfones, polyketones, polyetherketones, polysiloxanes, and combinations thereof; and (b) a flame retardant comprising (b1) a phosphorus salt having the formula

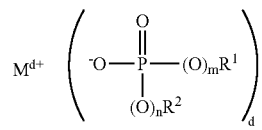

wherein $M^{d+}$ is $Al^{3+}$; occurrence of $R^1$ and $R^2$ is independently $C_1$-$C_6$ hydrocarbyl; and each occurrence of m and n is 0; and (b2) a trihydrocarbylphosphine oxide having the structure

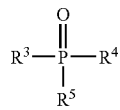

wherein $R^3$-$R^5$ are each independently $C_3$-$C_{12}$ hydrocarbyl.

One embodiment is a composition, comprising: (a) a thermoplastic resin comprising a poly(arylene ether); and (b) a flame retardant comprising aluminum tris(diethylphosphinate) and a phosphine oxide selected from triphenylphosphine oxide, allyldiphenylphosphine oxide, diallylphenylphosphine oxide, triallylphosphine oxide, and combinations thereof.

One embodiment is a composition, comprising: (a) a thermoset resin selected from selected from epoxy resins, unsaturated polyester resins, polyimide resins, bismaleimide resins, bismaleimide triazine resins, cyanate ester resins, vinyl resins, benzoxazine resins, benzocyclobutene resins, acrylics, alkyds, phenol-formaldehyde resins, novolacs, resoles, melamine-formaldehyde resins, urea-formaldehyde resins, hydroxymethylfurans, isocyanates, diallyl phthalate, triallyl cyanurate, triallyl isocyanurate, unsaturated polyesterimides, and combinations thereof; and (b) a flame retardant comprising (b1) a phosphorus salt having the formula

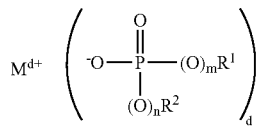

wherein $M^{d+}$ is $Al^{3+}$; occurrence of $R^1$ and $R^2$ is independently $C_1$-$C_6$ hydrocarbyl; and each occurrence of m and n is 0; and (b2) a trihydrocarbylphosphine oxide having the structure

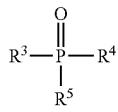

wherein $R^3$-$R^5$ are each independently $C_3$-$C_{12}$ hydrocarbyl.

Another embodiment is a composition, comprising: (a) a thermoset resin comprising a bisphenol A epoxy resin; and (b) a flame retardant comprising aluminum tris(diethylphosphinate) and a phosphine oxide selected from triphenylphosphine oxide, allyldiphenylphosphine oxide, diallylphenylphosphine oxide, triallylphosphine, and combinations thereof.

In addition to the thermoplastic resin and/or thermoset resin, and the flame retardant, the composition may comprise one or more various additives known in the art for thermoplastic and thermoset compositions. Suitable additives for thermoplastic compositions include, for example, plasticizers, impact modifiers, fillers, reinforcing agents (including disc-shaped fillers and fibrous fillers), mold release agents, colorants (including pigments and dyes), thermal stabilizers, light stabilizers, antioxidants, adhesion promoters, drip retardants, antiblocking agents, antistatic agents, blowing agents, and combinations thereof. Suitable additives for thermoset compositions include, for example, impact modifiers, low profile additives, cure agents, hardeners, cure inhibitors, fillers, reinforcing agents (including disc-shaped fillers and fibrous fillers), mold release agents, flow modifiers, colorants (including pigments and dyes), thermal stabilizers, light stabilizers, antioxidants, adhesion promoters, drip retardants, antiblocking agents, antistatic agents, and the like, and combinations thereof.

Apparatus and techniques for blending thermoplastic compositions and thermoset compositions are known in the art. Apparatus suitable for preparing thermoplastic blends includes, for example, two-roll mills, Banbury mixers, and single-screw and twin-screw extruders. Apparatus suitable for preparing thermoset blends includes, for example, flasks or beakers with mechanical stirring that are used for dissolving the PPE oligomer in a suitable solvent or curable compound. Mild heat is used to facilitate dissolution. A square or rectangular pan containing the resin solution is used for coating/impregnation of glass cloth via dipping the cloth into the resin solution.

The composition is useful for fabricating articles or parts of articles. Thus, one embodiment is an article comprising any of the above-described polymer compositions. When the composition comprises a thermoset resin, the article may comprise the composition in an uncured, partially cured, or fully cured state. Techniques for fabricating articles from thermoset compositions are discussed below in the context of the curable composition comprising a functionalized poly (arylene ether) resin. Techniques for fabricating articles from thermoplastic compositions include, for example, film and sheet extrusion, injection molding, gas-assist injection molding, extrusion molding, compression molding and blow molding. The article may be in the form of a film, sheet, molded object or composite having at least one layer comprising the composition.

The invention further includes a method of preparing the polymer composition. Thus, one embodiment is a method of preparing a composition, comprising: blending (a) a thermoplastic resin or a thermoset resin; and (b) a flame retardant comprising (b1) a phosphorus salt having the formula

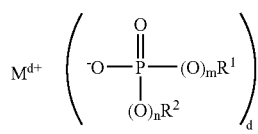

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (b2) a phosphine compound selected from trihydrocarbylphosphines, trihydrocarbylphosphine oxides, and combinations thereof; to form an intimate blend.

The flame retardant is particularly useful in curable compositions comprising a poly(arylene ether) with polymerizable functionality. Thus, a third category of embodiments relates to a curable composition, comprising: (a) a functionalized poly(arylene ether) resin; (b) a curable compound selected from triallyl cyanurate, triallyl isocyanurate, epoxy resins, bismaleimide resins, bismaleimide triazine resins, and combinations thereof; and (c) a flame retardant, comprising (c1) a phosphorus salt having the formula

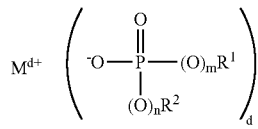

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (c2) a phosphine compound selected from trihydrocarbylphosphines, trihydrocarbylphosphine oxides, and combinations thereof.

The curable composition comprises a functionalized poly(arylene ether). The functionalized poly(arylene ether) may be a capped poly(arylene ether), a particular type of dicapped poly(arylene ether), a ring-functionalized poly(arylene ether), or a poly(arylene ether) resin comprising at least one terminal functional group selected from carboxylic acid, glycidyl ether, vinyl ether, and anhydride.

In one embodiment, the functionalized poly(arylene ether) comprises a capped poly(arylene ether) having the formula Q(J–K)$_y$ wherein Q is the residuum of a monohydric, dihydric, or polyhydric phenol; y is 1 to 100, more specifically 1, 2, 3, 4, 5, or 6; J has the formula

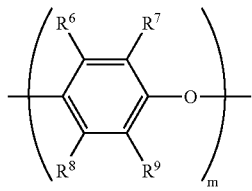

wherein $R^6$ and $R^8$ are each independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, and the like; $R^7$ and $R^9$ are each independently selected from the group consisting of halogen, primary or secondary $C_1$-$C_{12}$ alkyl, $C_2$-$C_{12}$ alkenyl, C2-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, and the like; m is 1 to about 200; and K is a capping group selected from the group consisting of

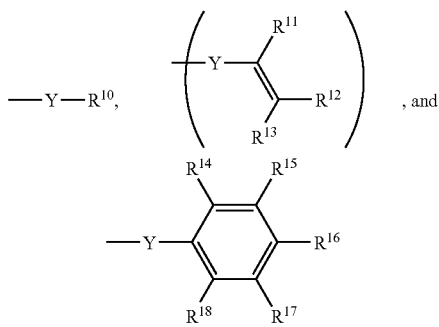

wherein $R^{10}$ is $C_1$-$C_{12}$ alkyl; $R^{11}$-$R^{13}$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate; $R^{14}$-$R^{18}$ are each independently selected from the group consisting of hydrogen, halogen, $C_1$-$C_{12}$ alkyl, hydroxy, and amino; and wherein Y is a divalent group selected from the group consisting of

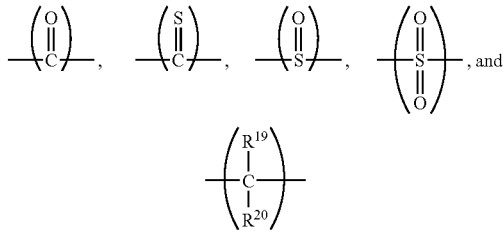

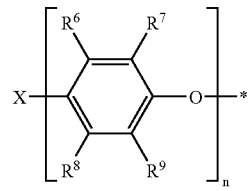

wherein $R^{19}$ and $R^{20}$ are each independently selected from the group consisting of hydrogen and $C_1$-$C_{12}$ alkyl. As used herein, the term "haloalkyl" includes alkyl groups substituted with one or more halogen atoms, including partially and fully halogenated alkyl groups.

In one embodiment, Q is the residuum of a phenol, including polyfunctional phenols, and includes radicals of the structure $$X-\left[\begin{array}{c}R^6 \quad R^7 \\ \phantom{X}\\ R^8 \quad R^9\end{array}-O\right]_n-*$$

wherein $R^6$ and $R^8$ are each independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, $C_6$-$C_{12}$ aryl (including phenyl), $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like; $R^7$ and $R^9$ are each independently halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, $C_6$-$C_{12}$ aryl (including phenyl), $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like; X may be hydrogen, $C_1$-$C_{18}$ hydrocarbyl, or $C_1$-$C_{18}$ hydrocarbyl containing a substituent such as carboxylic acid, aldehyde, alcohol, amino radicals, or the like; X also may be sulfur, sulfonyl, sulfuryl, oxygen, $C_1$-$C_{12}$ alkylidene, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may be the residuum of a monohydric phenol. Q may also be the residuum of a diphenol, such as 2,2',6,6'-tetramethyl-4,4'-diphenol. Q may also be the residuum of a bisphenol, such as 2,2-bis(4-hydroxyphenyl)propane ("bisphenol A" or "BPA").

In one embodiment, the capped poly(arylene ether) is produced by capping a poly(arylene ether) consisting essentially of the polymerization product of at least one monohydric phenol having the structure

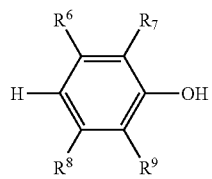

wherein $R^6$ and $R^8$ are each independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, $C_6$-$C_{12}$ aryl (including phenyl), $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like; and $R^7$ and $R^9$ are each independently halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, $C_6$-$C_{12}$ aryl (including phenyl), $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In one embodiment, the capped poly(arylene ether) comprises at least one capping group having the structure

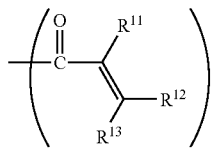

wherein $R^{11}$-$R^{13}$ are each independently hydrogen, $C_1$-$C_{18}$ hydrocarbyl, $C_2$-$C_{18}$ hydrocarbyloxycarbonyl, nitrile, formyl, carboxylate, imidate, thiocarboxylate, or the like; $R^9$-$R^{13}$ are each independently hydrogen, halogen, $C_1$-$C_{12}$ alkyl, hydroxy, amino, or the like. Highly preferred capping groups include acrylate ($R^{11}$=$R^{12}$=$R^{13}$=hydrogen) and methacrylate ($R^{11}$=methyl, $R^{12}$=$R^{13}$=hydrogen). It will be understood that the prefix "(meth)acryl-" means either "acryl-" or "methacryl-".

In one embodiment, the capped poly(arylene ether) corresponds to the structure above wherein Q is the residuum of a dihydric phenol, and y is 2. For example, the capped poly (arylene ether) may comprise a dicapped poly(arylene ether) having the structure

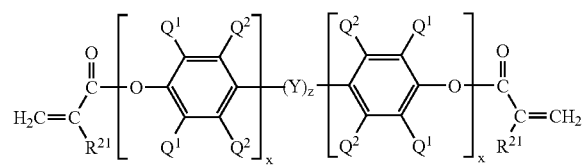

wherein each occurrence of $Q^2$ is independently selected from hydrogen, halogen, primary or secondary $C_1$-$C_{12}$ alkyl, $C_2$-$C_{12}$ alkenyl, $C_3$-$C_{12}$ alkenylalkyl, $C_2$-$C_{12}$ alkynyl, $C_3$-$C_{12}$ alkynylalkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; wherein each occurrence of $Q^1$ is independently selected from halogen, primary or secondary $C_1$-$C_{12}$ alkyl, $C_2$-$C_{12}$ alkenyl, $C_3$-$C_{12}$ alkenylalkyl, $C_2$-$C_{12}$ alkynyl, $C_3$-$C_{12}$ alkynylalkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; each occurrence of $R^{21}$ is independently hydrogen or methyl; each occurrence of x is independently 1 to about 100; z is 0 or 1; and Y has a structure selected from

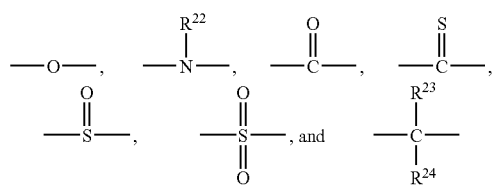

wherein each occurrence of $R^{22}$, $R^{23}$, and $R^{24}$ is independently selected from hydrogen and $C_1$-$C_{12}$ hydrocarbyl.

There is no particular limitation on the method by which the capped poly(arylene ether) is prepared. The capped poly (arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-α,α-dimethylphenylisocyanate, cyanatobenzene, 2,2-bis(4-cyanatophenyl)propane), 3-(alpha-chloromethyl) styrene, 4-(alpha -chloromethyl)styrene, allyl bromide, and the like, carbonate and substituted derivatives thereof, and mixtures thereof. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; U.S. Pat. No. 6,627,704 B2 to Yeager et al.; and European Patent No. 261,574 B1 to Peters et al.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino) pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols.

In another embodiment, the functionalized poly(arylene ether) comprises a ring-functionalized poly(arylene ether) comprising repeating structural units of the formula

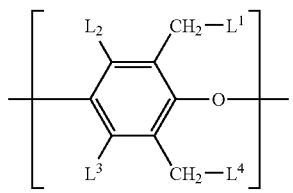

wherein each $L^1$-$L^4$ is independently hydrogen, a $C_1$-$C_{12}$ alkyl group, an alkenyl group, or an alkynyl group; wherein the alkenyl group is represented by

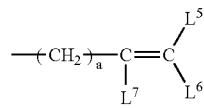

wherein $L^5$-$L^7$ are independently hydrogen or methyl, and a is 0, 1, 2, 3, or 4; wherein the alkynyl group is represented by

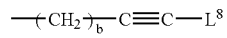

wherein $L^8$ is hydrogen, methyl, or ethyl, and b is 0, 1, 2, 3, or 4; and wherein about 0.02 mole percent to about 25 mole percent of the total $L^1$-$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups. The ring-functionalized poly(arylene ether) of this embodiment may be prepared according to known methods. For example, an unfunctionalized poly(arylene ether) such as poly(2,6-dimethyl-1,4-phenylene ether) may be metallized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

In another embodiment, the ring-functionalized poly (arylene ether) is the product of the melt reaction of a poly (arylene ether) and an α,β-unsaturated carbonyl compound or a β-hydroxy carbonyl compound. Examples of α,β-unsaturated carbonyl compounds include, for example, maleic anhydride, citriconic anhydride, and the like. Examples of β-hydroxy carbonyl compounds include, for example, citric acid, and the like. Such functionalization is typically carried out by melt mixing the poly(arylene ether) with the desired carbonyl compound at a temperature of about 190 to about 290° C.

In one embodiment, the functionalized poly(arylene ether) resin comprises at least one terminal functional group selected from carboxylic acid, glycidyl ether, vinyl ether, and anhydride. These particular functionalized poly(arylene ether) resins are particularly useful in combination with epoxy resins. A suitable method for preparing a poly(arylene ether) resin substituted with terminal carboxylic acid groups is described in, for example, European Patent No. 261,574 B1 to Peters et al. Glycidyl ether-functionalized poly(arylene ether) resins and methods for their preparation are described, for example, in U.S. Pat. No. 6,794,481 to Amagai et al. and U.S. Pat. No. 6,835,785 to Ishii et al., and U.S. Patent Application Publication No. 2004/0265595 A1 to Tokiwa. Vinyl ether-functionalized poly(arylene ether) resins and methods for there preparation are described, for example, in U.S. Statutory Invention Registration No. H521 to Fan. Anhydride-functionalized poly(arylene ether) resins and methods for their preparation are described, for example, in European Patent No. 261,574 B1 to Peters et al., and U.S. Patent Application Publication No. 2004/0258852 A1 to Ohno et al.

There is no particular limitation on the molecular weight or intrinsic viscosity of the functionalized poly(arylene ether). In one embodiment, the functionalized poly(arylene ether) resin has an intrinsic viscosity of about 0.03 to about 0.6 deciliter per gram (dL/g) measured at 25° C. in chloroform. Within this range, the intrinsic viscosity may be at least about 0.06 dL/g, or at least about 0.1 dL/g. Also within this range, the intrinsic viscosity may be up to about 0.5 dL/g, or up to about 0.4 dL/g, or up to about 0.3 dL/g. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly (arylene ether). It is expressly contemplated to employ blends of at least two functionalized poly(arylene ether)s having different molecular weights and intrinsic viscosities. The composition may comprise a blend of at least two functionalized poly(arylene ethers). Such blends may be prepared from individually prepared and isolated functionalized poly (arylene ethers). Alternatively, such blends may be prepared by reacting a single poly(arylene ether) with at least two functionalizing agents. For example, a poly(arylene ether) may be reacted with two capping agents, or a poly(arylene ether) may be metallized and reacted with two unsaturated alkylating agents. In another alternative, a mixture of at least two poly(arylene ether) resins having different monomer compositions and/or molecular weights may be reacted with a single functionalizing agent.

One embodiment is a curable composition wherein the functionalized poly(arylene ether) is a capped poly(arylene ether) or a ring-functionalized poly(arylene ether); and wherein the curable compound is selected from triallyl cyanurate, triallyl isocyanurate, bismaleimide resins, bismaleimide triazine resins, and combinations thereof.

The curable composition may comprise the functionalized poly(arylene ether) in an amount of about 5 to about 80 parts by weight of the functionalized poly(arylene ether), based on 100 parts by weight total of the functionalized poly(arylene ether), the curable compound, and the flame retardant. Within this range, the functionalized poly(arylene ether) amount may be at least about 10 parts per weight, or at least about 20 parts by weight. Also within this range, the functionalized poly(arylene ether) amount may be up to about 70 parts by weight, or up to about 50 parts by weight.

The curable composition comprises a curable compound selected from triallyl cyanurate, triallyl isocyanurate, epoxy resins, bismaleimide resins, bismaleimide triazine resins, and the like, and combinations thereof. These curable compounds and methods for their preparation are known in the art, and many examples are commercially available. The curable composition may comprise the curable compound in an amount of about 20 to about 95 parts by weight of the curable compound, based on 100 parts by weight total of the functionalized poly(arylene ether), the curable compound, and the flame retardant. Within this range, the curable compound amount may be at least about 30 parts by weight, or at least about 40 parts by weight. Also within this range, the curable compound amount may be up to about 90 parts by weight, or up to about 80 parts by weight.

In addition to the functionalized poly(arylene ether) resin and the curable compound, the curable composition comprises the flame retardant described above. The flame retardant may be present in an amount of about 1 to about 40 parts by weight, based on 100 parts by weight total of the functionalized poly(arylene ether), the curable compound, and the flame retardant. Within this range, the flame retardant amount may be at least about 10 parts by weight, or at least about 15 parts by weight. Also within this range, the flame retardant amount may be up to about 30 parts by weight.

One embodiment is a curable composition, comprising: (a) a capped poly(arylene ether) resin; (b) a curable compound selected from triallyl cyanurate, triallyl isocyanurate, bismaleimide resins, bismaleimide triazine resins, and combinations thereof; and (c) a flame retardant, comprising a phosphorus salt having the formula

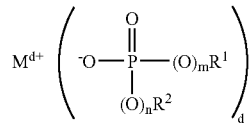

wherein $M^{d+}$ is $Al^{3+}$; occurrence of $R^1$ and $R^2$ is independently $C_1$-$C_6$ hydrocarbyl; and each occurrence of m and n is 0, and a trihydrocarbylphosphine oxide having the structure

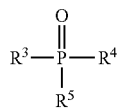

wherein $R^3$-$R^5$ are each independently $C_3$-$C_{12}$ hydrocarbyl.

Another embodiment is a curable composition, comprising: (a) a (meth)acrylate-capped poly(2,6-dimethyl-1,4-phenylene ether) resin; (b) a triallyl cyanurate, a triallyl isocyanurate, or a combination thereof; and (c) a flame retardant comprising aluminum tris(diethylphosphinate) and a phosphine oxide selected from triphenylphosphine oxide, allyldiphenylphosphine oxide, diallylphenylphosphine oxide, triallylphosphine oxide, and combinations thereof.

The invention includes partially and fully cured compositions obtained on curing the curable composition. Curing may be effected by methods known in the art, including thermal curing (with or without an added curing agent) and photo-chemical curing. The invention also includes articles formed from the curable composition. Such articles can be formed using thermoset processing methods known in the art including, for example, resin transfer molding; sheet molding; bulk molding; pultrusion; injection molding, including reaction injection molding (RIM); atmospheric pressure molding (APM); casting, including centrifugal and static casting open mold casting; lamination including wet or dry lay up and spray lay up; also included are contact molding, including cylindrical contact molding; compression molding; including vacuum assisted resin transfer molding and chemically assisted resin transfer molding; Seeman's Composite Resin Infusion Manufacturing Processing (SCRIMP); open molding, continuous combination of resin and glass; and filament winding, including cylindrical filament winding.

The invention further includes methods of preparing the curable composition. Thus, one embodiment is a method of preparing a curable composition, comprising: blending (a) a functionalized poly(arylene ether) resin; (b) a curable compound selected from triallyl cyanurate, triallyl isocyanurate, epoxy resins, bismaleimide resins, bismaleimide triazine resins, and combinations thereof; and (c) a flame retardant, comprising (c1) a phosphorus salt having the formula

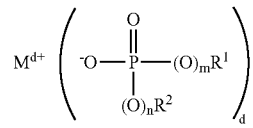

wherein $M^{d+}$ is a metal ion or an onium ion; d is 1, 2, 3, or 4 according to the identity of M and its oxidation state; each occurrence of $R^1$ and $R^2$ is independently $C_1$-$C_{18}$ hydrocarbyl; and each occurrence of m and n is independently 0 or 1; and (c2) a phosphine compound selected from trihydrocarbylphosphines, trihydrocarbylphosphine oxides, and combinations thereof; to form an intimate blend.

The invention is further illustrated by the following non-limiting examples.

EXAMPLES 1-4, COMPARATIVE EXAMPLES 1-7

These examples and comparative examples illustrate the flame retardant synergy of a phosphorus salt and a phosphine compound according to the invention. All compositions included 47.5 parts by weight triallyl isocyanurate ("TAIC"), obtained from Degussa Corporation; 27.2 parts by weight of a methacrylate-capped poly(2,6-dimethyl-1,4-phenylene ether) ("MA-PPE") having an intrinsic viscosity of 0.12 dL/g, prepared according to the method of U.S. Pat. No. 6,384,176 to Braat et al.; and 25.3 parts by weight of glass fiber having a diameter of about 14 micrometers and an initial length of about 4 millimeters, obtained as 497-14C from Owens-Corning. The samples varied in their flame retardant types and amounts. Comparative Example 1 contained no flame retardant. Comparative Examples 2-4 contained increasing amounts of aluminum tris(diethylphosphinate) ("Al(OPEt$_2$)$_3$"), obtained as OP930 from Clariant. Comparative Examples 5-7 contained increasing amounts of allyldiphenylphosphine oxide ("ADPPO"), obtained as from Sigma-Aldrich. Examples 1-4 contained varying amounts of both aluminum tris(diethylphosphinate) and allyldiphenylphosphine oxide. Complete formulations are given in Table 1, with component amounts expressed in parts by weight (pbw).

Curable compositions were prepared by heating at 90-95° C. a mixture of methacrylate-capped poly(arylene ether), triallyl isocyanurate and t-butyl catechol until the poly(arylene ether) was dissolved. Next the aluminum tris(diethylphosphinate) and allyldiphenylphosphine oxide were added and mixed while maintaining the temperature at 90-95° C. Then the chopped glass fiber was added and mixed while maintaining the temperature at 90-95° C. Finally the peroxide was added, and quickly mixed. The curable compositions were molded by transferring into a 254 millimeters×254 millimeters×3.175 millimeters (10 inches×10 inches×0.125 inches) mold, which was preheated to 100° C. and placed in an oven at 100° C. for 15-18 hours. Then the temperature was increased in steps: one hour at 110° C., two hours at 125° C., one hour at 150° C., and ten minutes at 175° C. The oven was turned off and the mold allowed to cool to ambient temperature overnight. The cured plaque was removed from the mold and cut into test articles having dimensions 127 millimeters× 12.7 millimeters×3.175 millimeters (5 inches×0.5 inches× 0.125 inches) using a tile cutting saw which had a diamond cutting blade. The flame retardancy of test articles was determined according to Underwriter's Laboratory UL 94 test procedure. For a V-0 rating, no individual burn times from the first or second flame application may exceed 10 seconds; the total of the burn times for any five specimens may not exceed 50 seconds; and drip particles that ignite a piece of cotton gauze situated below the specimen are not allowed. For a V-1 rating, no individual burn times from the first or second flame application may exceed 30 seconds; the total of the burn times for any five specimens may not exceed 250 seconds; and drip particles that ignite a piece of cotton gauze situated below the specimen are not allowed. For a V-2 rating, no individual burn times from the first or second flame application may exceed 30 seconds; the total of the burn times for any five specimens may not exceed 250 seconds; and drip particles that ignite a piece of cotton gauze situated below the specimen are allowed. "Flame out time (sec)" refers to the average flame out time per sample (averaged over five samples) in the UL 94 test, expressed in units of seconds. Flame retardancy test results are given in Table 1. The results show that the phosphate salt and phosphine compound are both mildly effective flame retardants, and that the combination of the phosphate salt and phosphine compound is an extremely effective flame retardant. For example, Comparative Example 4 (11.11 pbw Al(OPEt$_2$)$_3$), Comparative Example 7 (11.11 pbw ADPPO), and Example 1 (5.56 pbw each of Al(OPEt$_2$)$_3$ and ADPPO) all have the same total amount of flame retardant, but the respective flame out times are 44.1, 104.3, and 13.2 seconds, respectively. Examples 2-4 further illustrate that the flame retardant combination makes it possible to achieve flame out times on the order of 5 seconds using a total of about 23 parts by weight of flame retardant per 100 parts by weight total of functionalized poly(arylene ether) and curable compound.

TABLE 1

|  | C. Ex. 1 | C. Ex. 2 | C. Ex. 3 | C. Ex. 4 | C. Ex. 5 | C. Ex. 6 |
|---|---|---|---|---|---|---|
| TAIC (pbw) | 47.5 | 47.5 | 47.5 | 47.5 | 47.5 | 47.5 |
| MA-PPE (pbw) | 27.2 | 27.2 | 27.2 | 27.2 | 27.2 | 27.2 |
| Al(OPEt$_2$)$_3$ (pbw) | 0 | 2.56 | 5.26 | 11.11 | 0 | 0 |
| ADPPO (pbw) | 0 | 0 | 0 | 0 | 2.56 | 5.26 |
| Glass fibers (pbw) | 25.3 | 25.3 | 25.3 | 25.3 | 25.3 | 25.3 |
| Flame out time (sec) | 225.4 | 176.7 | 131.7 | 44.1 | 185.6 | 153.8 |

TABLE 1-continued

|  | C. Ex. 7 | Ex. 1 | Ex. 2 | Ex. 3 | Ex. 4 |
|---|---|---|---|---|---|
| TAIC (pbw) | 47.5 | 47.5 | 47.5 | 47.5 | 47.5 |
| MA-PPE (pbw) | 27.2 | 27.2 | 27.2 | 27.2 | 27.2 |
| Al(OPEt$_2$)$_3$ (pbw) | 0 | 5.56 | 5.88 | 11.76 | 7.43 |
| ADPPO (pbw) | 11.1 | 5.56 | 11.76 | 5.88 | 9.43 |
| Glass fibers (pbw) | 25.3 | 25.3 | 25.3 | 25.3 | 25.3 |
| Flame out time (sec) | 104.3 | 13.2 | 5.04 | 4.18 | 4.76 |

EXAMPLES 5-14, COMPARATIVE EXAMPLES 8-10

These examples illustrate that the synergistic effect demonstrated in the previous examples is also obtained when triphenylphosphine oxide is used as the phosphine compound. Triphenylphosphine oxide ("TPPO") was obtained from Sigma-Aldrich. Compositions were prepared, molded, and tested as described above. Compositions and results are presented in Table 2 (which reiterates the results of Comparative Examples 1-4). The results again show that the phosphate salt and phosphine compound are both mildly effective flame retardants, and that the combination of the phosphate salt and phosphine compound is an extremely effective flame retardant. For example, Comparative Example 4 (11.11 pbw Al(OPEt$_2$)$_3$), Comparative Example 10 (11.11 pbw TPPO), and Example 6 (5.56 pbw each of Al(OPEt$_2$)$_3$ and TPPO) all have the same total amount of flame retardant, but the respective flame out times are 44.1, 91.1, and 18.6 seconds, respectively. Examples 8-14 further illustrate that the flame retardant combination makes it possible to achieve flame out times less than 10 seconds using as little as 19 parts by weight of flame retardant per 100 parts by weight total of functionalized poly(arylene ether) and curable compound.

TABLE 2

|  | C. Ex. 1 | C. Ex. 2 | C. Ex. 3 | C. Ex. 4 | C. Ex. 8 | C. Ex. 9 |
|---|---|---|---|---|---|---|
| TAIC (pbw) | 47.5 | 47.5 | 47.5 | 47.5 | 47.5 | 47.5 |
| MA-PPE (pbw) | 27.2 | 27.2 | 27.2 | 27.2 | 27.2 | 27.2 |
| Al(OPEt$_2$)$_3$ (pbw) | 0 | 2.56 | 5.26 | 11.11 | 0 | 0 |
| TPPO (pbw) | 0 | 0 | 0 | 0 | 2.56 | 5.26 |
| Glass fibers (pbw) | 25.3 | 25.3 | 25.3 | 25.3 | 25.3 | 25.3 |
| Flame out time (sec) | 225.4 | 176.7 | 131.7 | 44.1 | 162.5 | 131.4 |

|  | C. Ex. 10 | Ex. 5 | Ex. 6 | Ex. 7 | Ex. 8 | Ex. 9 |
|---|---|---|---|---|---|---|
| TAIC (pbw) | 47.5 | 47.5 | 47.5 | 47.5 | 47.5 | 47.5 |
| MA-PPE (pbw) | 27.2 | 27.2 | 27.2 | 27.2 | 27.2 | 27.2 |
| Al(OPEt$_2$)$_3$ (pbw) | 0 | 5.41 | 5.56 | 5.26 | 10.01 | 4.15 |
| TPPO (pbw) | 11.11 | 2.70 | 5.56 | 7.43 | 4.63 | 10.01 |
| Glass fibers (pbw) | 25.3 | 25.3 | 25.3 | 25.3 | 25.3 | 25.3 |
| Flame out time (sec) | 91.1 | 60.1 | 18.6 | 15.6 | 8.9 | 6.9 |

|  | Ex. 10 | Ex. 11 | Ex. 12 | Ex. 13 | Ex. 14 |
|---|---|---|---|---|---|
| TAIC (pbw) | 47.5 | 47.5 | 47.5 | 47.5 | 47.5 |
| MA-PPE (pbw) | 27.2 | 27.2 | 27.2 | 27.2 | 27.2 |
| Al(OPEt$_2$)$_3$ (pbw) | 7.33 | 5.88 | 7.43 | 11.76 | 12.50 |
| TPPO (pbw) | 10.68 | 11.76 | 9.43 | 5.88 | 12.50 |
| Glass fibers (pbw) | 25.3 | 25.3 | 25.3 | 25.3 | 25.3 |
| Flame out time (sec) | 5.62 | 5.34 | 5.10 | 4.76 | 2.22 |

EXAMPLES 15-54, COMPARATIVE EXAMPLES 11-17

These examples describe the fabrication of laminates using the curable composition. Laminates were prepared by impregnating glass cloth (17.78 centimeters (7 inches) by 19.05 centimeters (7.5 inches)) with a toluene solution of resin and flame retardant. After mixing the resin solution for 30 minutes, the resin solution was heated to 65° C. for 15-30 seconds. After two cycles of dipping the glass cloth, the glass cloth was dried overnight by evaporation to obtain about 50 weight percent impregnated curable composition (i.e., a "prepreg"). Laminates were produced by stacking several prepregs, compression molding for four minutes at a temperature of 150-180° C. at a pressure of 13.34 kilonewtons (3000 pounds), and cooling for three minutes in a hot press. The average thickness for each laminate was determined using a micrometer. Average first flame out times and average second flame out times were determined according to UL 94.

Compositions are presented in Table 3. In addition to components previously described, the curable compositions contained the curing initiator 2,5-bis (t-butyl peroxy)-2,5-dimethyl-3-hexyne, and the curing inhibitor tert-butylcatechol. The flammability test results, presented in Table 3, show that the flame retardant composition makes it possible to consistently achieve a highly desirable V-0 rating using as little as 20 parts by weight of flame retardant per 100 parts by weight total of functionalized poly(arylene ether) and curable compound. Increasing the amount of flame retardant gives better flame out times. Furthermore, greater flame out times are expected for thicker samples.

TABLE 3

| | C. Ex. 11 | C. Ex. 12 | C. Ex. 13 | Ex. 15 | Ex. 16 | Ex. 17 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 0 | 10 | 0 | 10 | 10 | 10 |
| TPPO (pbw) | 0 | 0 | 10 | 10 | 10 | 10 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.39 | 1.50 | 1.47 | 0.76 | 1.63 | 1.17 |
| Average first flame out time (sec) | 42.9 | 28.4 | 28.9 | 30.7 | 23.8 | 36.1 |
| Average second flame out time (sec) | 1.38 | 44.3 | 1.0 | 0.96 | 3.68 | 1.08 |
| UL 94 rating | V-2 | V-2 | V-2 | V-1 | V-1 | V-1 |

| | Ex. 18 | Ex. 19 | Ex. 20 | Ex. 21 | Ex. 22 | Ex. 23 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 10 | 10 | 10 | 10 | 2 | 18 |
| TPPO (pbw) | 10 | 10 | 10 | 10 | 18 | 2 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.43 | 1.47 | 1.45 | 1.63 | 1.38 | 1.48 |
| Average first flame out time (sec) | 17.0 | 24.9 | 17.7 | 15.8 | 14.0 | 24.3 |
| Average second flame out time (sec) | 3.24 | 3.98 | 2.5 | 3.8 | 1.2 | 6.0 |
| UL 94 rating | V-1 | V-1 | V-1 | V-1 | V-1 | V-1 |

| | Ex. 24 | Ex. 25 | Ex. 26 | Ex. 27 | Ex. 28 | Ex. 29 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 15 | 20 | 25 | 20 | 18 | 23 |
| TPPO (pbw) | 15 | 20 | 25 | 20 | 15 | 23 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.50 | 1.61 | 1.55 | 2.02 | 1.85 | 1.58 |
| Average first flame out time (sec) | 17.8 | 6.86 | 2.40 | 1.76 | 1.48 | 2.88 |
| Average second flame out time (sec) | 5.1 | 7.46 | 3.62 | 11.36 | 9.18 | 7.86 |
| UL 94 rating | V-1 | V-0 | V-0 | V-1 | V-1 | V-1 |

| | Ex. 30 | Ex. 31 | Ex. 32 | Ex. 33 | Ex. 34 | C. Ex. 14 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 12 | 12 | 25 | 20 | 15 | 0 |
| TPPO (pbw) | 12 | 12 | 25 | 20 | 15 | 0 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.79 | 1.94 | 2.61 | 2.70 | 2.51 | 2.45 |
| Average first flame out time (sec) | 2.68 | 2.06 | 1.02 | 1.16 | 1.18 | 23.22 |
| Average second flame out time (sec) | 8.18 | 6.76 | 2.32 | 3.46 | 6.82 | 60.54 |
| UL 94 rating | V-1 | V-1 | V-0 | V-0 | V-0 | V-2 |

| | Ex. 35 | Ex. 36 | Ex. 37 | Ex. 38 | Ex. 39 | Ex. 40 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 20 | 20 | 20 | 16.5 | 23 | 20 |
| TPPO (pbw) | 20 | 20 | 20 | 16.5 | 23 | 20 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 2.02 | 1.40 | 1.50 | 2.50 | 2.50 | 2.15 |
| Average first flame out time (sec) | 1.28 | 4.16 | 4.36 | 1.12 | 0.96 | 1.00 |
| Average second flame out time (sec) | 15.8 | 0.96 | 2.94 | 12.8 | 7.34 | 8.06 |
| UL 94 rating | V-1 | V-0 | V-0 | V-1 | V-0 | V-0 |

| | Ex. 41 | Ex. 42 | C. Ex. 15 | Ex. 43 | Ex. 44 | Ex. 45 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 18 | 15 | 0 | 25 | 25 | 25 |
| TPPO (pbw) | 18 | 0 | 0 | 25 | 25 | 25 |
| ADPPO (pbw) | 0 | 15 | 20 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.65 | 1.50 | 1.50 | 1.60 | 1.50 | 1.65 |
| Average first flame out time (sec) | 2.16 | 1.96 | 4.30 | 0.94 | 0.90 | 0.82 |

TABLE 3-continued

|  |  |  |  |  |  |  |
|---|---|---|---|---|---|---|
| Average second flame out time (sec) | 9.62 | 4.42 | 16.56 | 4.42 | 4.90 | 5.50 |
| UL 94 rating | V-0 | V-0 | V-0 | V-0 | V-0 | V-0 |

|  | Ex. 46 | Ex. 47 | Ex. 48 | Ex. 49 | Ex. 50 | Ex. 51 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 25 | 25 | 0 | 0 | 0 | 20 |
| TPPO (pbw) | 25 | 25 | 20 | 20 | 20 | 20 |
| ADPPO (pbw) | 0 | 0 | 20 | 20 | 20 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.70 | 1.55 | 2.78 | 2.86 | 1.60 | 1.90 |
| Average first flame out time (sec) | 1.06 | 0.72 | 1.70 | 1.65 | 1.70 | 0.88 |
| Average second flame out time (sec) | 4.28 | 1.43 | 1.38 | 1.28 | 2.80 | 1.94 |
| UL 94 rating | V-0 | V-0 | V-0 | V-0 | V-0 | V-0 |

|  | Ex. 52 | Ex. 53 | Ex. 54 | C. Ex. 16 | C. Ex. 17 |
|---|---|---|---|---|---|
| TAIC (pbw) | 100 | 100 | 100 | 100 | 100 |
| MA-PPE (pbw) | 100 | 100 | 100 | 100 | 100 |
| Al(OPEt$_2$)$_3$ (pbw) | 20 | 20 | 25 | 20 | 0 |
| TPPO (pbw) | 20 | 20 | 25 | 0 | 20 |
| ADPPO (pbw) | 0 | 0 | 0 | 0 | 0 |
| Initiator (pbw) | 2.02 | 2.02 | 2.02 | 2.02 | 2.02 |
| Inhibitor (pbw) | 0.205 | 0.205 | 0.205 | 0.205 | 0.205 |
| Laminate thickness (mm) | 1.50 | 1.60 | 3.14 | 1.50 | 1.50 |
| Average first flame out time (sec) | 4.00 | 3.14 | 1.65 | 16.56 | 14.00 |
| Average second flame out time (sec) | 1.06 | 1.80 | 2.32 | 4.30 | 1.06 |
| UL 94 rating | V-0 | V-0 | V-0 | V-1 | V-1 |

Dielectric properties were measured for several of the laminates. Dielectric constants (Dk) and dissipation factors (Df) were determined at the specified frequencies according to Baker-Jarvis J., Janezic M., Riddle B., Holloway C., Paulter N., and Blendell J. NIST Technical Note 1520, *Dielectric and Conductor-Loss Characterization and Measurements on Electronic Packaging Materials* (sects 3.2.1 and 3.2.2), 2001. Results are presented in Table 4. Average values reflect two independent determinations. The results show that the amount of flame retardancy does not change the dielectrics of the laminate.

TABLE 4

|  | Ex. 15 | Ex. 17 | Ex. 20 | Ex. 19 | Ex. 21 | Ex. 30 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 10 | 10 | 10 | 10 | 10 | 12 |
| TPPO (pbw) | 10 | 10 | 10 | 10 | 10 | 12 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 0.76 | 1.17 | 1.45 | 1.47 | 1.63 | 1.79 |
| Avg. Dk at 10 GHz | 4.15 | 3.42 | — | — | — | — |
| Avg. Dk at 2.4 GHz | — | — | 4.54 | 4.01 | 4.62 | 4.61 |
| Avg. Df at 10 GHz | $5.8 \times 10^{-3}$ | $5.4 \times 10^{-3}$ | — | — | — | — |
| Avg. Df at 2.4 GHz | — | — | $4.5 \times 10^{-3}$ | $4.4 \times 10^{-3}$ | $4.7 \times 10^{-3}$ | $4.7 \times 10^{-3}$ |

|  | Ex. 27 | Ex. 28 | Ex. 29 | Ex. 30 | Ex. 31 | Ex. 32 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 20 | 18 | 23 | 12 | 12 | 25 |
| TPPO (pbw) | 20 | 15 | 23 | 12 | 12 | 25 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 2.02 | 1.85 | 1.58 | 1.79 | 1.94 | 2.61 |
| Avg. Dk at 10 GHz | — | — | — | — | — | — |
| Avg. Dk at 2.4 GHz | 3.98 | 4.23 | 3.97 | 4.16 | 3.99 | 4.04 |
| Avg. Df at 10 GHz | — | — | — | — | — | — |
| Avg. Df at 2.4 GHz | $4.4 \times 10^{-3}$ | $4.6 \times 10^{-3}$ | $4.3 \times 10^{-3}$ | $4.8 \times 10^{-3}$ | $4.3 \times 10^{-3}$ | $5.3 \times 10^{-3}$ |

|  | Ex. 33 | Ex. 34 | C. Ex. 14 | Ex. 35 | Ex. 36 | Ex. 37 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 20 | 15 | 0 | 20 | 20 | 20 |
| TPPO (pbw) | 20 | 15 | 0 | 20 | 20 | 20 |
| ADPPO (pbw) | 0 | 0 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 2.70 | 2.51 | 2.45 | 2.02 | 1.40 | 1.50 |

TABLE 4-continued

|  |  |  |  |  |  |  |
|---|---|---|---|---|---|---|
| Avg. Dk at 10 GHz | — | — | — | — | — | — |
| Avg. Dk at 2.4 GHz | 4.10 | 3.93 | 4.02 | 4.23 | 3.70 | 3.80 |
| Avg. Df at 10 GHz | — | — | — | — | — | — |
| Avg. Df at 2.4 GHz | $4.5 \times 10^{-3}$ | $4.3 \times 10^{-3}$ | $4.4 \times 10^{-3}$ | $4.5 \times 10^{-3}$ | $4.5 \times 10^{-3}$ | $4.2 \times 10^{-3}$ |

|  | Ex. 38 | Ex. 39 | Ex. 40 | Ex. 41 | Ex. 42 | C. Ex. 15 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 16.5 | 23 | 20 | 18 | 15 | 0 |
| TPPO (pbw) | 16.5 | 23 | 20 | 18 | 0 | 0 |
| ADPPO (pbw) | 0 | 0 | 0 | 0 | 15 | 20 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 2.50 | 2.50 | 2.15 | 1.65 | 1.50 | 1.50 |
| Avg. Dk at 10 GHz | — | — | — | — | — | — |
| Avg. Dk at 2.4 GHz | 4.35 | 4.42 | 4.41 | 4.16 | 4.12 | 4.39 |
| Avg. Df at 10 GHz | — | — | — | — | — | — |
| Avg. Df at 2.4 GHz | $4.4 \times 10^{-3}$ | $4.5 \times 10^{-3}$ | $4.6 \times 10^{-3}$ | $4.7 \times 10^{-3}$ | $4.8 \times 10^{-3}$ | $4.9 \times 10^{-3}$ |

|  | Ex. 43 | Ex. 44 | Ex. 45 | Ex. 46 | Ex. 48 | Ex. 48 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 25 | 25 | 25 | 25 | 25 | 0 |
| TPPO (pbw) | 25 | 25 | 25 | 25 | 25 | 20 |
| ADPPO (pbw) | 0 | 0 | 0 | 0 | 0 | 20 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 1.60 | 1.50 | 1.65 | 1.70 | 1.55 | 2.78 |
| Avg. Dk at 10 GHz | — | — | — | — | — | — |
| Avg. Dk at 2.4 GHz | 4.21 | 4.20 | 3.86 | 4.00 | 4.06 | 4.17 |
| Avg. Df at 10 GHz | — | — | — | — | — | — |
| Avg. Df at 2.4 GHz | $4.8 \times 10^{-3}$ | $4.7 \times 10^{-3}$ | $4.5 \times 10^{-3}$ | $4.6 \times 10^{-3}$ | $4.5 \times 10^{-3}$ | $4.8 \times 10^{-3}$ |

|  | Ex. 49 | Ex. 50 | Ex. 51 | Ex. 52 | Ex. 53 | Ex. 54 |
|---|---|---|---|---|---|---|
| TAIC (pbw) | 100 | 100 | 100 | 100 | 100 | 100 |
| MA-PPE (pbw) | 100 | 100 | 100 | 100 | 100 | 100 |
| Al(OPEt$_2$)$_3$ (pbw) | 0 | 0 | 20 | 20 | 20 | 25 |
| TPPO (pbw) | 20 | 20 | 20 | 20 | 20 | 25 |
| ADPPO (pbw) | 20 | 20 | 0 | 0 | 0 | 0 |
| Initiator (pbw) | 2.02 | 2.02 | 2.02 | 2.02 | 2.02 | 2.02 |
| Inhibitor (pbw) | 0.205 | 0.205 | 0.205 | 0.205 | 0.205 | 0.205 |
| Laminate thickness (mm) | 2.86 | 1.60 | 1.90 | 1.50 | 1.60 | 3.14 |
| Avg. Dk at 10 GHz | — | — | — | — | — | — |
| Avg. Dk at 2.4 GHz | 4.26 | 4.06 | 4.02 | 4.02 | 4.07 | 4.10 |
| Avg. Df at 10 GHz | — | — | — | — | — | — |
| Avg. Df at 2.4 GHz | $4.8 \times 10^{-3}$ | $4.8 \times 10^{-3}$ | $4.3 \times 10^{-3}$ | $4.3 \times 10^{-3}$ | $4.4 \times 10^{-3}$ | $4.4 \times 10^{-3}$ |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All ranges disclosed herein are inclusive of the endpoints, and the endpoints are combinable with each other.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

The invention claimed is:

1. A curable composition, comprising:
   (a) a capped functionalized poly(arylene ether) resin;
   (b) a curable compound selected from triallyl cyanurate, triallyl isocyanurate, bismaleimide resins, bismaleimide triazine resins, and combinations thereof; and
   (c) a flame retardant, comprising
      a phosphorus salt having the formula

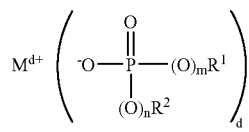

wherein $M^{d+}$ is $Al^{3+}$; d is 3; each occurrence of $R^1$ and $R^2$ is independently $C_1$-$C_6$ hydrocarbyl; and each occurrence of m and n is independently 0; and a trihydrocarbylphosphine oxide having the structure

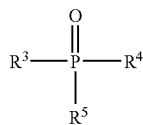

wherein $R^3$-$R^5$ are each independently $C_3$-$C_{12}$ hydrocarbyl;

wherein the phosphorus salt is present in the amount of 20 to 80 parts by weight and the trihydrocarbylphosphine oxide is present in the amount of 80 to 20 parts by weight, based on 100 parts by weight total of the phosphorus salt and the trihydrocarbylphosphine oxide, and wherein the curable composition comprises about 1 to about 40 parts by weight of the flame retardant, based on 100 parts by weight total of the functionalized capped poly(arylene ether) resin, the curable compound, and the flame retardant.

2. A curable composition, comprising:
(a) a functionalized poly(arylene ether) resin that comprises a (meth)acrylate-capped poly(2,6-dimethyl-1,4-phenylene ether) resin;
(b) a curable compound that comprises a triallyl cyanurate, a triallyl isocyanurate, or a combination thereof; and
(c) flame retardant compounds comprising aluminum tris(diethylphosphinate) and a phosphine oxide selected from triphenylphosphine oxide, allyldiphenylphosphine oxide, diallylphenylphosphine oxide, triallylphosphine oxide, and combinations thereof;
wherein the phosphorus salt is present in the amount of 20 to 80 parts by weight and the phosphine oxide is present in the amount of 80 to 20 parts by weight, based on 100 parts by weight total of the phosphorus salt and the phosphine oxide, and wherein the curable composition comprises about 1 to about 40 parts by weight of the flame retardant compounds, based on 100 parts by weight total of the functionalized poly(arylene ether) resin, the curable compound, and the flame retardant compounds.

3. A cured composition, comprising the cured product of the curable composition of claim 1.

4. An article comprising the composition of claim 3.

5. A method of preparing a curable composition, comprising:
blending
(a) a functionalized poly(arylene ether) resin;
(b) a curable compound selected from triallyl cyanurate, triallyl isocyanurate, epoxy resins, bismaleimide resins, bismaleimide triazine resins, and combinations thereof; and
(c) a flame retardant, comprising
(c1) a phosphorus salt having the formula

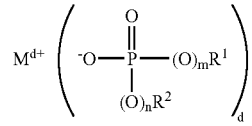

wherein $M^{d+}$ is $Al^{3+}$; d is each occurrence of $R^1$ and $R^2$ independently $C_1$-$C_6$ hydrocarbyl; and each occurrence of m and n is independently 0; and
(c2) a trihydrocarbylphosphine oxide having the structure

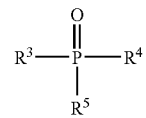

wherein $R^3$-$R^5$ are each independently $C_3$-$C_{12}$ hydrocarbyl; to form an intimate blend;
wherein the phosphorus salt is present in the amount of 20 to 80 parts by weight and the trihydrocarbylphosphine oxide is present in the amount of 80 to 20 parts by weight, based on 100 parts by weight total of the phosphorus salt and the trihydrocarbylphosphine oxide and wherein the curable composition comprises about 1 to about 40 parts by weight of the flame retardant, based on 100 parts by weight total of the functionalized poly(arylene ether) resin, the curable compound, and the flame retardant.

* * * * *

UNITED STATES PATENT AND TRADEMARK OFFICE
CERTIFICATE OF CORRECTION

PATENT NO. : 7,495,047 B2  
APPLICATION NO. : 11/244989  
DATED : October 6, 2006  
INVENTOR(S) : Edward Norman Peters Page 1 of 1

It is certified that error appears in the above-identified patent and that said Letters Patent is hereby corrected as shown below:

Title Page,
Item (73), Assignee, delete "AT&T Intellectual Property, I, L.P., f/k/a BellSouth Intellectual Property Corporation, Wilmington, Delaware" and insert therefore --SABIC INNOVATIVE PLASTICS IP B.V., Netherlands--.

Signed and Sealed this

Thirtieth Day of June, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,495,047 B2
APPLICATION NO. : 11/244989
DATED : February 24, 2009
INVENTOR(S) : Edward Norman Peters Page 1 of 1

It is certified that error appears in the above-identified patent and that said Letters Patent is hereby corrected as shown below:

<u>Title Page</u>,
Item (73), Assignee, delete "AT&T Intellectual Property, I, L.P., f/k/a BellSouth Intellectual Property Corporation, Wilmington, Delaware" and insert therefore --SABIC INNOVATIVE PLASTICS IP B.V., Netherlands--.

This certificate supersedes the Certificate of Correction issued June 30, 2009.

Signed and Sealed this

Twenty-eighth Day of July, 2009

JOHN DOLL
*Acting Director of the United States Patent and Trademark Office*